(12) United States Patent
Varahabhotla et al.

(10) Patent No.: US 12,314,941 B2
(45) Date of Patent: May 27, 2025

(54) ENABLING CRYPTOGRAPHIC TRANSFERS

(71) Applicant: Coinbase, Inc., Oakland, CA (US)

(72) Inventors: Varun Varahabhotla, Bellevue, WA (US); Erick Ho, Oakland, CA (US); Shiv Ansal, Cupertino, CA (US); Andrew Hang, Temple City, CA (US); Mansi Prakash, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 233 days.

(21) Appl. No.: 18/167,778

(22) Filed: Feb. 10, 2023

(65) Prior Publication Data
US 2024/0273522 A1 Aug. 15, 2024

(51) Int. Cl.
*G06Q 20/00* (2012.01)
*G06Q 20/22* (2012.01)
*G06Q 20/38* (2012.01)

(52) U.S. Cl.
CPC ....... *G06Q 20/3829* (2013.01); *G06Q 20/223* (2013.01); *G06Q 20/3825* (2013.01)

(58) Field of Classification Search
CPC ............. G06Q 20/3829; G06Q 20/223; G06Q 20/3825; G06Q 30/06; G06Q 30/08; G06Q 2220/00

USPC ........................ 705/16, 21, 59; 380/262, 278
See application file for complete search history.

(56) References Cited

U.S. PATENT DOCUMENTS

| | | | | |
|---|---|---|---|---|
| 2011/0300950 | A1* | 12/2011 | Noda | G07F 17/3216 463/46 |
| 2022/0300950 | A1* | 9/2022 | Yakovlev | G06F 21/31 |
| 2023/0360029 | A1* | 11/2023 | Pranger | G06Q 20/10 |

* cited by examiner

*Primary Examiner* — Dante Ravetti
(74) *Attorney, Agent, or Firm* — Foley & Lardner LLP

(57) ABSTRACT

Methods and systems are described herein for performing cryptographic operations. In particular, the system receives identifiers for blockchain operation requests (e.g., bids) for transferring control of a non-fungible token (NFT) from a first blockchain address to a second blockchain address in exchange for payment (e.g., fungible tokens). The system provides visual indications of the blockchain operation requests to a first user device associated with a first cryptography-based storage application (e.g., an address associated with a cryptographic wallet of a user). The system may receive, from the first user device, a command to approve one of the blockchain operation requests and may determine an on-chain program (e.g., smart contract) for transferring the NFT. The system may submit, to the on-chain program, a request to transfer the NFT to the second blockchain address associated with the approved first blockchain operation request.

20 Claims, 8 Drawing Sheets

| Non-Fungible Token | Token Holder | First Source Bids | Second Source Bids |
|---|---|---|---|
| nonfungible_token_1 | user_1 | bid_1_1a<br>bid_1_1b | bid_2_1a<br>...<br>bid_2_1n |
| nonfungible_token_2 | user_1 | bid_1_2a<br>...<br>bid_1_2n | bid_2_2a<br>...<br>bid_2_2n |
| nonfungible_token_3 | user_2 | bid_1_3a<br>...<br>bid_1_3n | bid_2_3n |

| Non-Fungible Token | Token Holder | Bids |
|---|---|---|
| | | 303 306 309 |
| nonfungible_token_1 | user_1 | bid_1_1a<br>bid_1_1b<br>bid_2_1a<br>...<br>bid_2_1n |

ENABLING CRYPTOGRAPHIC TRANSFERS

BACKGROUND

In recent years, the use of blockchains and blockchain technology has exponentially increased. Blockchains are built upon lists of records, called "blocks," that are "chained" together using cryptography. Each block may include data that is computed using a one-way function (e.g., a function that is practically impossible to invert or reverse-compute) of a previous block, a timestamp (e.g., indicating a creation or modification time), and additional data (e.g., transactional or operational data related to blockchain operations).

Blockchains and blockchain technology may be applicable to numerous technological avenues. Many current blockchains allow creation of new cryptographic tokens that may be exchanged for other cryptographic tokens or otherwise sent and received between users. A subset of these tokens is sometimes referred to as non-fungible tokens (NFTs). NFTs, unlike fungible tokens that are all the same (e.g., Bitcoins), are created to be differentiated from each other. For example, when a user acquires a Bitcoin, the user is unable to distinguish one Bitcoin from another Bitcoin, as those tokens are fungible. However, when a user acquires an NFT, that NFT is unique (non-fungible) and, thus, two NFTs can be differentiated (e.g., based on their attributes).

Various systems exist today that enable prospective buyers to attempt to acquire NFTs. Many of those systems require that an owner of an NFT actively seek out acquisition requests for various platforms and programs and compare the bids across platforms and programs. Oftentimes, NFTs may be listed on these platforms and programs without the knowledge of the NFT owner and, as such, the owner is unaware of acquisition requests that have been submitted for their NFTs. Even if the owner does seek out the acquisition requests, the owner must explore various platforms and programs to find all acquisition requests that have been submitted for their NFTs and must manually compare the acquisition requests received from various platforms and programs. As a result, the user may have difficulty comparing acquisition requests to determine which request, if any, to approve. Moreover, the user must constantly monitor multiple platforms and programs to determine whether any attractive acquisition requests have been newly submitted.

SUMMARY

Therefore, methods and systems are described herein for performing cryptographic operations. Generally, a bid acceptance system may receive identifiers for blockchain operation requests (e.g., bids) for transferring control of an NFT from a first blockchain address (a first cryptographic wallet) to another blockchain address (a second cryptographic wallet) in exchange for payment (e.g., fungible tokens). The system may provide visual indications of the blockchain operation requests (e.g., of the bids) to a first user device associated with a first cryptography-based storage application (e.g., an address associated with a cryptographic wallet of a user that controls the NFT being bid on). The system may receive, from the first user device, a command to approve one of the blockchain operation requests (e.g., approve one of the bids) and may determine an on-chain program (e.g., a smart contract) for transferring control of the NFT to the corresponding bidder. The system may submit, to the on-chain program, a request to transfer the NFT to a second blockchain address associated with the approved first blockchain operation request (e.g., the approved bid).

In some embodiments, the bid acceptance system may receive a plurality of identifiers for a plurality of blockchain operation requests for transferring control of an NFT of a user from a first blockchain address to another blockchain address. For example, the bid acceptance system may determine bids that have been submitted across various platforms and programs and may receive identifiers of these bids. Thus, the bid acceptance system may use one or more application programming interfaces (APIs) to query third-party platforms for any bids for one or more NFTs. In addition, the bid acceptance system may use another API to query a blockchain and identify any bids for one or more NFTs that were added directly to the blockchain without being added to a third-party platform.

In some embodiments, each blockchain operation request of the plurality of blockchain operation requests may indicate a proposed transfer of control of the NFT to another blockchain address and a corresponding transfer of control of one or more fungible tokens (e.g., Bitcoins) to the first blockchain address (e.g., in exchange for the NFT). Each blockchain operation request may include an indicator of the NFT (e.g., a cryptographic address associated with the NFT) and one or more indicators of the one or more fungible tokens (e.g., an amount of cryptocurrency).

In some embodiments, receiving the indicators of the blockchain operation requests may include determining a type of a source of the plurality of blockchain operation requests (e.g., a type of computing platform associated with the bid, a smart contract, etc.). Based on determining that a type of the source is a computing platform, the bid acceptance system may initiate a corresponding API to request, from the computing platform, the one or more blockchain operation requests. Based on determining that the type of the source is the on-chain program, the bid acceptance system may transmit a new blockchain operation request via a blockchain node to the on-chain program, requesting the one or more blockchain operation requests (i.e., requesting the transfer). For example, if a particular computing platform publishes and supports its own API, the bid acceptance system may identify the API and use that API to retrieve NFT bids from the computing platform. In some embodiments, each computing platform or each type of a computing platform may have a corresponding API.

The bid acceptance system may provide visual indications of the plurality of blockchain operation requests to the user's computing device associated with a first cryptography-based storage application. For example, the visual indications may include the proposed transfer of control of a particular NFT (e.g., an identifier of the NFT and an image representing the NFT) and the corresponding transfer of control of one or more fungible tokens in exchange (e.g., proposed payment in cryptocurrency such as Ethereum). In some embodiments, the bid acceptance system may generate for display visual indications of each bid submitted across various platforms and programs. In some embodiments, the bid acceptance system may display the bids within an application associated with the user (e.g., an application associated with a cryptographic wallet of a user).

The bid acceptance system may receive, from the user's computing device, an approval command to approve the first blockchain operation request of the plurality of blockchain operation requests. In some embodiments, the approval command may be an approval blockchain operation signed with a private key associated with the first blockchain address. That is, the user may accept the bid and sign a blockchain transaction to perform the exchange. In some embodiments, the approval command may be a command to approve a bid based on the visual indications provided by the bid acceptance system. The approval command may be a selection of a visual indication, an entry of an identifier, or another input.

In some embodiments, the bid acceptance system may retrieve a source identifier for a source of the first blockchain request. For example, the source may be a computing platform or program through which the first blockchain request was submitted. The bid acceptance system may determine whether the first blockchain address is initialized with the source of the first blockchain operation request. For example, each source may store a listing of blockchain addresses associated with that source. The blockchain protocol may require that a blockchain address (e.g., of a smart contract associated with the source) be approved by a controlling address before the source is able to facilitate a transaction involving that blockchain address. Accordingly, the source may reject any transaction when a given blockchain address has not been approved and listed within the computing platform. In response to determining that the first blockchain address is not initialized with the source of the first blockchain operation request, the bid acceptance system may transmit, to the user's computing device associated with the first blockchain address, a message (e.g., a request) to initialize the first blockchain address with the source of the first blockchain operation request. For example, the message may prompt the user to launch a cryptography-based storage application (e.g., a cryptographic wallet) and initialize the first blockchain address with a blockchain operation signed by the cryptography-based storage application (e.g., using the user's private key). Some sources may include a single on-chain program (e.g., a single smart contract) that may process all bid acceptance requests. Thus, the initialization process may require approval of that on-chain program. Other sources may include an on-chain program (e.g., a smart contract) for each user (e.g., each user bidding on an NFT). That is, each user may be associated with a smart contract that may be required to be approved by the seller (e.g., via a blockchain operation) before the bid may be accepted/approved.

The bid acceptance system may determine an on-chain program (e.g., a smart contract) for transferring the NFT. An on-chain program may be associated with the first blockchain operation request. For example, when a bidder generates a blockchain operation request, the source that receives the blockchain operation request may store a transaction, signed by the bidder, such that the transfer may be completed by the source if the NFT owner selects the blockchain operation request associated with that bidder. In this example, the bid acceptance system may identify the on-chain program associated with the blockchain operation request and may retrieve the signed transaction.

The bid acceptance system may submit, to the on-chain program, a request to transfer the NFT to the second blockchain address according to the accepted first blockchain operation request. For example, the bid acceptance system may request that the on-chain program complete the transaction (e.g., execute the smart contract). The bid acceptance system may be required to retrieve a source identifier for a source of the first blockchain operation request and transmit, to the user's computing device, a new blockchain operation request to approve the on-chain program associated with the first blockchain operation request. For example, the user may be required to authorize the on-chain program to transfer the NFT on the user's behalf. In some embodiments, the user may designate the on-chain program as an owner of the NFT in order to authorize the on-chain program.

In some embodiments, the bid acceptance system may determine whether the second blockchain address includes at least the one or more fungible tokens (e.g., sufficient funds to complete the transfer). If the bid acceptance system determines that the second blockchain address does not control enough fungible tokens (for the blockchain operation), the bid acceptance system may output another visual indication that control of the NFT will not transfer from the first blockchain address to the second blockchain address (e.g., due to insufficient fungible tokens).

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of a data structure storing blockchain operation requests from multiple sources, in accordance with one or more embodiments of this disclosure.

FIG. 3 illustrates a data structure storing blockchain operation requests for a non-fungible token, in accordance with one or more embodiments of this disclosure.

DETAILED DESCRIPTION

Figure 1:
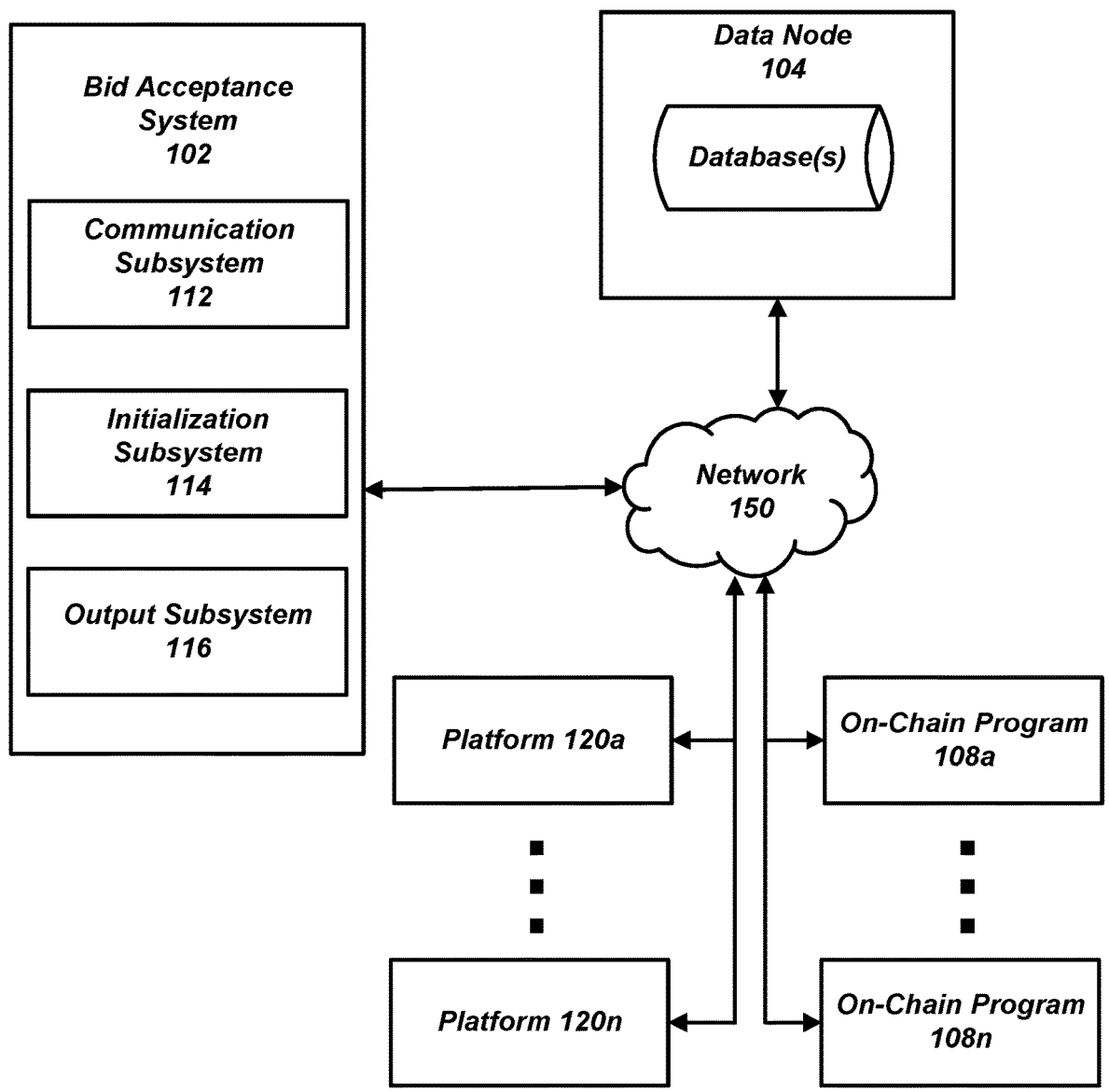
FIG. 1 shows an illustrative system for performing cryptographic operations, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

As referred to herein, blockchain operations may include any operations including or related to blockchains and blockchain technology. For example, blockchain operations may include conducting transactions, querying a distributed ledger, generating additional blocks for a blockchain, transmitting communications-related NFTs, performing encryption/decryption, exchanging public/private keys, or other operations related to blockchains and blockchain technology. In some embodiments, a blockchain operation may comprise the creation, modification, detection, or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, or review of a token (e.g., a digital blockchain-specific asset), including an NFT. An NFT may be a token that is associated with a good, a service, a smart contract, or other content that may be verified by, and stored using, blockchain technology.

In some embodiments, blockchain operations may also include actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

Users may be associated with cryptographic wallets used to perform blockchain operations. For example, the cryptographic wallet may comprise a repository that allows users to store, manage, and trade their cryptocurrencies and assets, interact with blockchains, or conduct blockchain operations using one or more applications. The cryptographic wallet may be specific to a given blockchain protocol or may provide access to multiple blockchain protocols. In some embodiments, system 100 may use various types of wallets, such as hot wallets and cold wallets. Hot wallets are connected to the Internet, while cold wallets are not. Most cryptographic wallet holders hold both a hot wallet and a cold wallet. Hot wallets are most often used to perform blockchain operations, while a cold wallet is generally used for managing a user account and may have no connection to the Internet.

An NFT may be associated with a first cryptography-based storage application (e.g., an address associated with a cryptographic wallet of a user) at a first blockchain address. As referred to herein, a cryptography-based storage application may refer to a cryptographic wallet. A cryptographic wallet may include a software-based system that securely (and typically in an encrypted format) stores users' confidential information, personal information, payment information, or passwords for numerous payment methods and websites. By using a cryptographic wallet, users can complete communications, purchases, or other blockchain operations easily and securely without risking the information becoming public or subject to a cyberattack.

System 100 may use public key cryptography, which features a pair of digital keys (e.g., which may comprise strings of data). In such cases, each pair comprises a public key (e.g., which may be public) and a private key (e.g., which may be kept private). System 100 may generate the key pairs using cryptographic algorithms (e.g., featuring one-way functions). System 100 may then encrypt a message (or other blockchain operation) using an intended receiver's public key such that the encrypted message may be decrypted only with the receiver's corresponding private key. In some embodiments, system 100 may combine a message with a private key to create a digital signature on the message. For example, the digital signature may be used to verify the authenticity of blockchain operations. As an illustration, when conducting blockchain operations, system 100 may use the digital signature to prove to every node in the system that it is authorized to conduct the blockchain operations.

For example, a blockchain may comprise a plurality of nodes for the blockchain network sometimes referred to as blockchain nodes. Each node may correspond to a user device. A node for a blockchain network may comprise an application or other software that records or monitors peer connections to other nodes or miners for the blockchain network. For example, a miner comprises a node in a blockchain network that facilitates blockchain operations by verifying blockchain operations on the blockchain, adding new blocks to the existing chain, or ensuring that these additions are accurate. The nodes may continually record the state of the blockchain and respond to remote procedure requests for information about the blockchain.

In some embodiments, a user device may request a blockchain operation (e.g., conduct a transaction). A blockchain operation request may be a request for a blockchain operation to enable control, via a private key, of one or more digital assets. For example, the blockchain operation may be a cryptocurrency transaction. The transaction may involve passing control of certain digital assets (e.g., tokens) from one wallet to another wallet. The blockchain operation may be authenticated by a user device or another node (e.g., a user device in the community network). For example, using cryptographic keys, system 100 may identify users and give access to their respective user accounts (e.g., corresponding cryptographic wallets) within the system. Using private keys (e.g., known only to the respective users) and public keys (e.g., known to the community network), the system may create digital signatures to authenticate the users.

Following an authentication of a blockchain operation (e.g., using a private key), the blockchain operation may be authorized. For example, after the blockchain operation is authenticated between users, system 100 may authorize the blockchain operation prior to adding it to the blockchain. System 100 may add the blockchain operation to a blockchain. System 100 may perform this based on a consensus of the user devices within system 100. For example, system 100 may rely on a majority (or other metric) of the nodes in the community network to determine that the blockchain operation is valid. In response to validation of the block, a node user device in the community network (e.g., a miner) may receive a reward (e.g., in a given cryptocurrency) as an incentive for validating the block.

To validate the blockchain operation, system 100 may use one or more validation protocols or validation mechanisms. For example, system 100 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 100 may use a proof-of-stake mechanism in which a user account (e.g., corresponding to a node on the blockchain network) is required to have, or "stake," a predetermined number of tokens in order for system 100 to recognize it as a validator in the blockchain network.

In response to validation of the block, the block is added to the blockchain, and the blockchain operation is completed. For example, to add the blockchain operation to the blockchain, the successful node (e.g., the successful miner) encapsulates the blockchain operation in a new block before transmitting the block throughout system 100.

FIG. 1 is an example of system 100 for performing cryptographic operations. System 100 includes bid acceptance system 102, data node 104, on-chain programs 108a-108n, platforms 120a-120n, and network 150. Bid acceptance system 102 may execute instructions for approving blockchain operation requests. Bid acceptance system 102 may include software, hardware, or a combination of the two. For example, bid acceptance system 102 may reside on a physical server or a virtual server that is running on a physical computer system. In some embodiments, bid acceptance system 102 may be configured on a user's computing device (e.g., a laptop computer, a smart phone, a desktop computer, an electronic tablet, or another suitable user device).

Data node 104 may store various data, including NFT data (e.g., extracted from blockchain operation data), on-chain program data, or other suitable data. Data node 104 may include software, hardware, or a combination of the two. An NFT may be a token that is associated with a good, a service, a smart contract, or other content that may be verified by, and stored using, blockchain technology. For example, data node 104 may be a physical server, or a virtual server that is running on a physical computer system. In some embodiments, bid acceptance system 102 and data node 104 may reside on the same hardware or the same virtual server/computing device. Network 150 may be a local area network (LAN), a wide area network (WAN) (e.g., the Internet), or a combination of the two. On-chain programs 108a-108n may be programs (e.g., smart contracts) residing on a blockchain. For example, a smart contract may be a program written in Solidity and deployed on the blockchain. An on-chain program may be executed by a blockchain node. Each of platforms 120a-120n may be an environment in which NFT transfers are facilitated. For example, platforms 120a-120n may be used to search, retrieve metadata for, and gain insights for NFTs across multiple blockchains. Platforms 120a-120n may be used to determine, based on on-chain addresses, NFTs that many users' cryptography-based storage applications control (e.g., NFTs that users own). Platforms 120a-120n may then be used to generate listings of the NFTs that are owned by various users. Platforms 120a-120n may approve bids for NFTs listed and may notify users associated with the corresponding cryptography-based storage applications of incoming bids.

In some embodiments, bid acceptance system 102 (e.g., communication subsystem 112) may receive a plurality of identifiers for a plurality of blockchain operation requests. Communication subsystem 112 may include software components, hardware components, or a combination of both. For example, communication subsystem 112 may include a network card (e.g., a wireless network card or a wired network card) that is associated with software to drive the card. In some embodiments, the blockchain operation requests received by communication subsystem 112 may be requests to transfer control of an NFT from a first blockchain address to another blockchain address. For example, the blockchain operation requests may be bids on a particular NFT. A first blockchain operation request of the plurality of blockchain operation requests may indicate a proposed first transfer of control of the NFT to a second blockchain address and a second transfer of control of one or more fungible tokens (e.g., Ethereum tokens) to the first blockchain address, and wherein the first blockchain operation request comprises an indicator of the NFT and one or more indicators of the one or more fungible tokens. In some embodiments, communication subsystem 112 may receive the blockchain operation requests from platforms 120a-120n. For example, platforms 120a-120n may receive bids from users of the platforms, and communication subsystem 112 may receive the bids from the platforms.

FIG. 2 illustrates an excerpt of a data structure 200 storing blockchain operation requests from multiple sources, in accordance with one or more embodiments of this disclosure. For example, data structure 200 may include non-fungible tokens 203, token holders 206 for each NFT, and bids from various sources, such as first source bids 209 and second source bids 212. In some embodiments, data structure 200 may include bids from any number of sources. The sources may correspond to platforms 120a-120n. For example, communication subsystem 112 may receive identifiers for bids, as discussed above, from various platforms. Communication subsystem 112 may determine to which NFTs the bids correspond. Communication subsystem 112 may also determine an owner of each NFT. Communication subsystem 112 may store this information in data structure 200 along with indicators of the bids received for each NFT from each source. Communication subsystem 112 may store data structure 200 in memory, on chain or off chain.

In some embodiments, communication subsystem 112 may generate a data structure for each NFT. FIG. 3 illustrates a data structure 300 storing blockchain operation requests for a non-fungible token, in accordance with one or more embodiments of this disclosure. For example, data structure 300 may include a non-fungible token 303, a token holder 306 of the NFT, and bids 309 received for the NFT. In some embodiments, bids 309 may include all bids received from multiple platforms (e.g., corresponding to first source bids 209 and second source bids 212, as shown in FIG. 2). For example, communication subsystem 112 may receive identifiers for bids from the platforms corresponding to non-fungible token 303. Communication subsystem 112 may determine an owner of the NFT. Furthermore, communication subsystem 112 may store this information in data structure 300 along with indicators of the bids received for the NFT from each source. In some embodiments, communication subsystem 112 may store, in a data structure such as data structure 300, all bids received for all bids owned by a given token holder. Communication subsystem 112 may store additional received information in any of these data structures. Communication subsystem 112 may store data structure 300 in memory, on chain or off chain.

Returning to FIG. 1, bid acceptance system 102 (e.g., output subsystem 116) may provide visual indications of the plurality of blockchain operation requests to a first computing device associated with a first cryptography-based storage application. In some embodiments, the first computing device may be a device of a user associated with the cryptographic wallet controlling the NFT. For example, visual indications may be messages (e.g., pop-ups, SMS messages, email communications), alerts, account updates, or other visual indications. In some embodiments, output subsystem 116 may provide a visual indication to a user in response to receiving a blockchain operation request for an NFT controlled (e.g., owned) by the user. In some embodiments, the visual indications may include information about the bid received, the NFT to which it relates, the source of the bid, and/or other information. Output subsystem 116 may populate the visual indication, for example, using data stored in data structure 200 or data structure 300. In some embodiments, the visual indications may include functionality (e.g., buttons, links, or other features) to guide the user to the platform from which the bid originated. In some embodiments, the visual indications may include functionality (e.g., buttons, links, or other features) to allow the user to approve a bid for an NFT.

Communication subsystem 112 may receive, from the first computing device, an approval command to approve the first blockchain operation request of the plurality of blockchain operation requests. The approval command may be received via a user interaction with a visual indication of a bid, as discussed above, may be received from a platform associated with the bid, or may be received in some other manner. In some embodiments, the approval command may include an approval blockchain operation signed with a private key associated with the first blockchain address. A blockchain operation may involve signing a blockchain operation request with a private key corresponding to the source cryptography-based storage application and sending the request to a blockchain node. Each cryptography-based storage application may use a unique private key for signing transactions. For example, if a user wants to send one or more digital assets (e.g., perform a cryptocurrency transaction), the user may be required to "sign" the transaction using the user's private key corresponding to the cryptography-based storage application and send the transaction to a blockchain node. The blockchain node may authenticate whether the signature is genuine, based on the public key associated with the private key, and, if so, execute the transaction. The blockchain node may authorize the blockchain operation by determining whether the blockchain address associated with the private key that signed the blockchain operation has control of the digital assets involved in the blockchain operation and may commit the transaction to the blockchain. The transaction may enable transfer of control of the digital assets using a private key associated with a target cryptography-based storage application.

Communication subsystem 112 may determine an on-chain program for transferring the NFT. On-chain programs may be programs (e.g., smart contracts) residing on a blockchain. For example, a smart contract may be a program written in Solidity and deployed on the blockchain. An on-chain program may be executed by a blockchain node. For example, communication subsystem 112 may identify a smart contract that created (e.g., minted) the NFT. Those on-chain programs may have associated metadata such as creator identifier, and other suitable metadata. Each NFT may store an identifier of a smart contract associated with that NFT (e.g., in data structure 200 or data structure 300). Communication subsystem 112 may determine that smart contract identifier from the NFT token data. In some embodiments, the platforms (e.g., platforms 120a-120n) may be associated with one or more smart contracts for transferring NFTs based on bids received via the platform. For example, when a user initializes a platform smart contract and accepts the bid, the user allows the platform's smart contract to submit a transaction to the smart contract that minted the NFT. Furthermore, when communication subsystem 112 publishes bids on the blockchain, communication subsystem 112 may publish the bids to the smart contract that minted the NFT or to another smart contract, such as a smart contract associated with the platform.

Once communication subsystem 112 determines the on-chain program for transferring the NFT, communication subsystem 112 may then extract a program identifier for the on-chain program. In some embodiments, communication subsystem 112 may publish the on-chain program data on the blockchain. In some embodiments, the smart contract may already be authorized by the bidder. For example, when a bidder places a bid on an NFT via a platform (e.g., platforms 120a-120n), the platform may store a signed transaction of the smart contract. The contract may thus be ready to execute when the NFT owner approves the bid.

Figure 4:
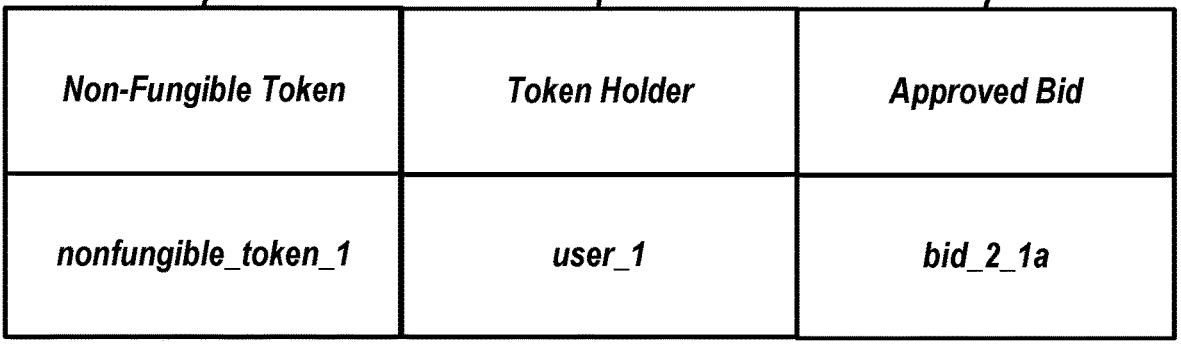
FIG. 4 illustrates a data structure storing an approved blockchain operation request, in accordance with one or more embodiments of this disclosure.

In some embodiments, communication subsystem 112 may store the approved first blockchain operation request (e.g., the approved bid). FIG. 4 illustrates a data structure 400 storing an approved blockchain operation request, in accordance with one or more embodiments of this disclosure. Data structure 400 may include a non-fungible token 403, a token holder 406, and an approved bid 409. In some embodiments, data structure 400 may be a subset of data structure 300 or data structure 200.

Figure 5:
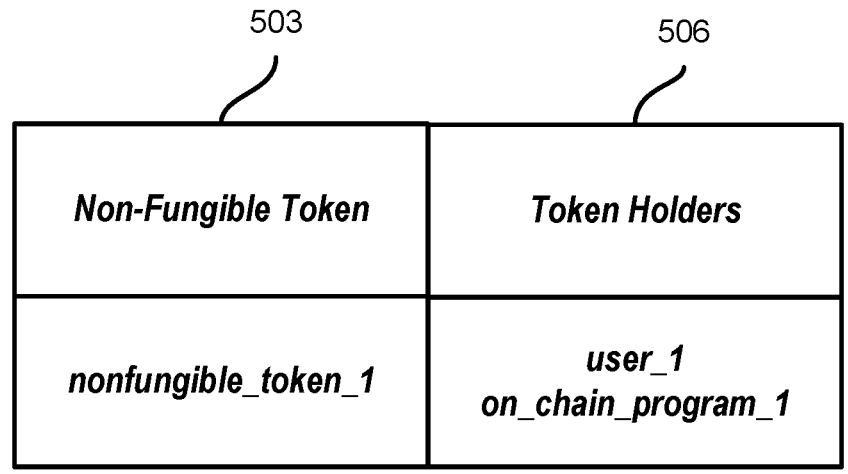
FIG. 5 illustrates a data structure storing identifiers of owners associated with a non-fungible token, in accordance with one or more embodiments of this disclosure.
Figure 5:
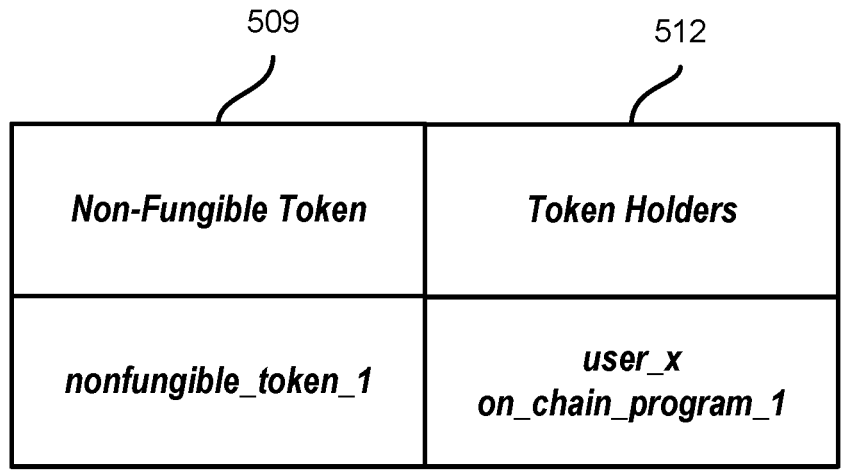

Communication subsystem 112 may submit, to the on-chain program, a request to transfer the NFT to the second blockchain address according to the approved first blockchain operation request. The request may include data structure 400 or the data included in data structure 400. In some embodiments, the request may be approved if the on-chain program is listed as an owner of the NFT, in addition to the NFT holder, in a data structure storing identifiers of owners of the NFT. FIG. 5 illustrates a data structure 500 and a data structure 550 storing identifiers of owners associated with a non-fungible token, in accordance with one or more embodiments of this disclosure. In some embodiments, data structure 500 may include non-fungible token 503 and token holders 506. Data structure 500 may represent owners associated with the NFT before a transfer of ownership is made. As shown in FIG. 5, token holders 506 include the first user and the on-chain program associated with the NFT. Data structure 550 may include non-fungible token 509 and token holders 512. Data structure 550 may represent owners associated with the NFT after the transfer of ownership is made. As shown in FIG. 5, token holders 512 include a different user and the on-chain program associated with the NFT.

In some embodiments, communication subsystem 112 may determine a type of a source of the one or more blockchain operation requests. In some embodiments, communication subsystem 112 may retrieve a source identifier for a source of the first blockchain operation request. The source identifier may identify the platform associated with the NFT. Communication subsystem 112 may transmit, to the first computing device (e.g., the device of the user who owns the NFT), a new blockchain operation request to approve the on-chain program associated with the first blockchain operation request. For example, the platform may require authorization of the NFT owner to transfer the NFT on the owner's behalf. In some embodiments, a user may be required to authorize a smart contract associated with the platform to transfer the NFT on the user's behalf.

Figure 6:
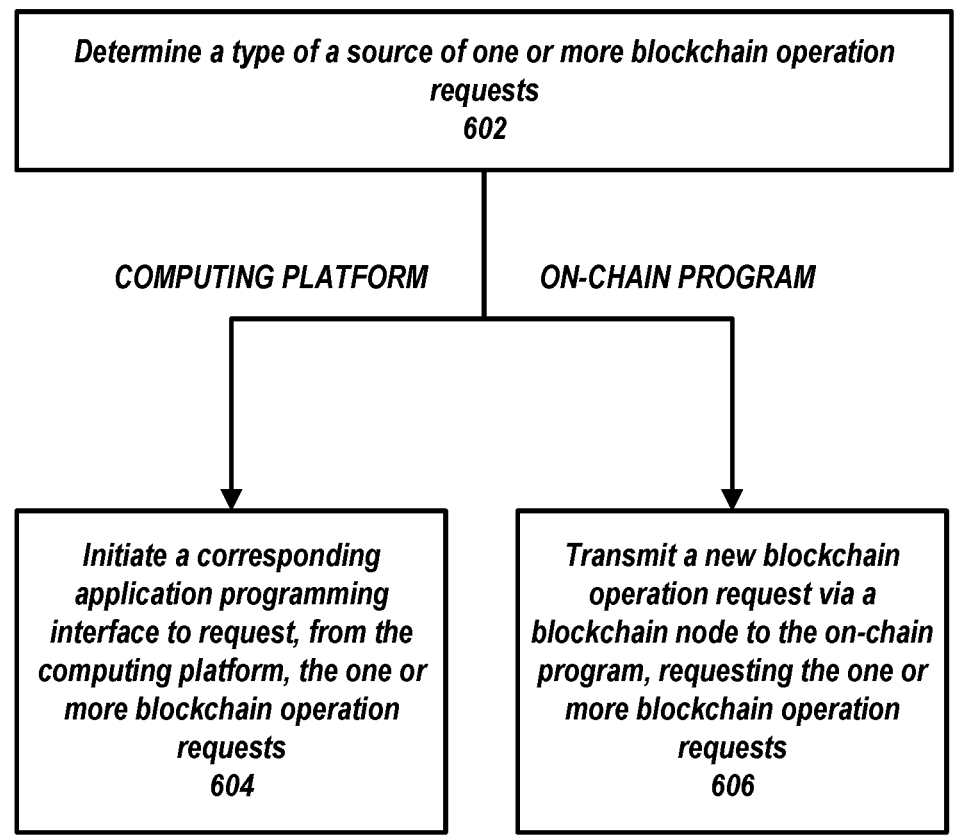
FIG. 6 illustrates a flowchart of operations for requesting blockchain operation requests, in accordance with one or more embodiments of this disclosure.

FIG. 6 illustrates a flowchart 600 of operations for requesting blockchain operation requests, in accordance with one or more embodiments of this disclosure. For example, flowchart 600 may be used to determine a type of source of one or more blockchain operation requests so that the source can be interrogated for blockchain operation requests. Interrogating may include requesting, based on the type of source, blockchain operation requests from the sources. At 602, bid acceptance system 102 determines a type of a source of one or more blockchain operation requests. For example, the type may be a computing platform (e.g., platforms 120a-120n), an on-chain program, or another type of source.

At 604, in response to determining that the type of source is a computing platform, bid acceptance system 102 may initiate a corresponding API to request, from the computing platform, the one or more blockchain operation requests. Bid acceptance system 102 may thus interrogate the API for the bids. Bid acceptance system 102 may conduct operations in a decentralized application using blockchain operations, in accordance with one or more embodiments. Each computing device may have an application that is implemented on, or accessible by, the computing device. For example, the application may interact with one or more other applications or APIs in order to facilitate blockchain operations. For example, the application may comprise a decentralized application cryptographic wallet or wallet service that is able to sign and send transactions to transfer tokens or perform other blockchain operations, as well as interact with one or more decentralized applications.

At 606, in response to determining that the type of source is an on-chain program, bid acceptance system 102 may transmit a new blockchain operation request via a blockchain node to the on-chain program, requesting the one or more blockchain operation requests. For example, in some embodiments, bidders may submit bids via the on-chain program. Thus, the source of the bids is the on-chain program itself. In this example, communication subsystem 112 may interrogate the on-chain program for the bids.

In some embodiments, once communication subsystem 112 has submitted the request to transfer the NFT from the first blockchain address to the second blockchain address according to the approved bid, bid acceptance system 102 (e.g., initialization subsystem 114) may determine whether the first blockchain address is initialized with the source of the bid. For example, a blockchain address may be initialized with a source (e.g., platform 120a-120n) if the blockchain address is stored in a data structure of addresses affiliated with the platform. For example, if a user of a cryptographic wallet has never interacted with the platform before, the cryptographic wallet is likely not initialized with the platform. In order to facilitate a transfer initiated on a particular platform, the cryptographic wallet of the user selling the NFT may need to be initialized with the platform. In addition, initialization subsystem 114 may receive an on-chain address associated with a cryptography-based storage application (e.g., an address associated with a cryptographic wallet of a user) and determine, based on the on-chain address, NFTs that the user's cryptography-based storage application controls (e.g., NFTs that the user owns). Initialization subsystem 114 may thus verify that the user owns the NFT that they are selling.

In some embodiments, initialization subsystem 114 may retrieve a source identifier for a source of the first blockchain operation request. Initialization subsystem 114 may then determine whether the first blockchain address is initialized with the source of the first blockchain operation request. In response to determining that the first blockchain address is not initialized with the source of the first blockchain operation request, output subsystem 116 may transmit, to the first computing device associated with the first blockchain address, a message to initialize the first blockchain address with the source of the first blockchain operation request. In some embodiments, the message may include functionality (e.g., buttons, links, or other features) to guide the user to the platform to initialize the blockchain address with the platform. In some embodiments, the visual indications may include functionality (e.g., buttons, links, or other features) to allow the user to initialize the blockchain address with the platform automatically.

In some embodiments, initialization subsystem 114 may retrieve a source identifier for a source of the first blockchain operation request. Initialization subsystem 114 may then determine whether the first blockchain address is initialized with the source of the first blockchain operation request. In response to determining that the first blockchain address is not initialized with the source of the first blockchain operation request, output subsystem 116 may transmit, to the first computing device associated with the first blockchain address, one or more blockchain operation requests to initialize the first blockchain address with the source and to approve the on-chain program to be able to transfer the NFT from the first blockchain address. In some embodiments, separate blockchain requests may be transmitted to initialize the first blockchain address with the source and to approve the on-chain program to be able to transfer the NFT. In some embodiments, initialization subsystem 114 may bundle the requests and transmit a single request to both initialize the first blockchain address with the source and approve the on-chain program to be able to transfer the NFT. In some embodiments, the request to approve the on-chain program may include a command to store the program identifier of the on-chain program as an owner of the NFT in a data structure associated with the NFT (e.g., as shown by token holders 506 in FIG. 5). In response to executing this request, the first computing device stores the program identifier in the data structure associated with the NFT.

In some embodiments, initialization subsystem 114 may retrieve a source identifier for a source of the first blockchain operation request. Initialization subsystem 114 may then determine whether the first blockchain address is initialized with the source of the first blockchain operation request. Initialization subsystem 114 may extract a program identifier for the on-chain program and determine whether the on-chain program has been approved to transfer the NFT from the first blockchain address. In response to determining that the first blockchain address is initialized with the source of the first blockchain operation request and that the on-chain program has not been approved to transfer the NFT from the first blockchain address, initialization subsystem 114 may transmit, to the first computing device associated with the first blockchain address, a blockchain operation request to approve the on-chain program to be able to transfer the NFT from the first blockchain address. In some embodiments, the request to approve the on-chain program may include a command to store the program identifier of the on-chain program as an owner of the NFT in a data structure associated with the NFT (e.g., as shown by token holders 506 in FIG. 5). In response to executing this request, the first computing device stores the program identifier in the data structure associated with the NFT.

In some embodiments, once the blockchain address is initialized with the source of the bids and the on-chain program is authorized to transfer the NFT on the seller's behalf, communication subsystem 112 may determine whether the second blockchain address comprises at least the one or more fungible tokens to be exchanged for the NFT. For example, communication subsystem 112 determines whether the second blockchain address includes enough tokens to proceed with the blockchain operation. Communication subsystem 112 may request, from the second blockchain address, the number of available digital assets, the value associated with each digital asset, and the transitory digital asset data. To perform the transaction, communication subsystem 112 may need to determine the number of digital assets (e.g., Ethereum tokens) available at the second blockchain address. In response to determining that the second blockchain address does not comprise at least the one or more fungible tokens (i.e., the second blockchain address has insufficient digital assets), output subsystem 116 may output another visual indication that the control of the NFT will not transfer from the first blockchain address to the other blockchain address. In some embodiments, output subsystem 116 may output a prompt to obtain additional fungible tokens in order to complete the transfer.

Computing Environment

Figure 7:
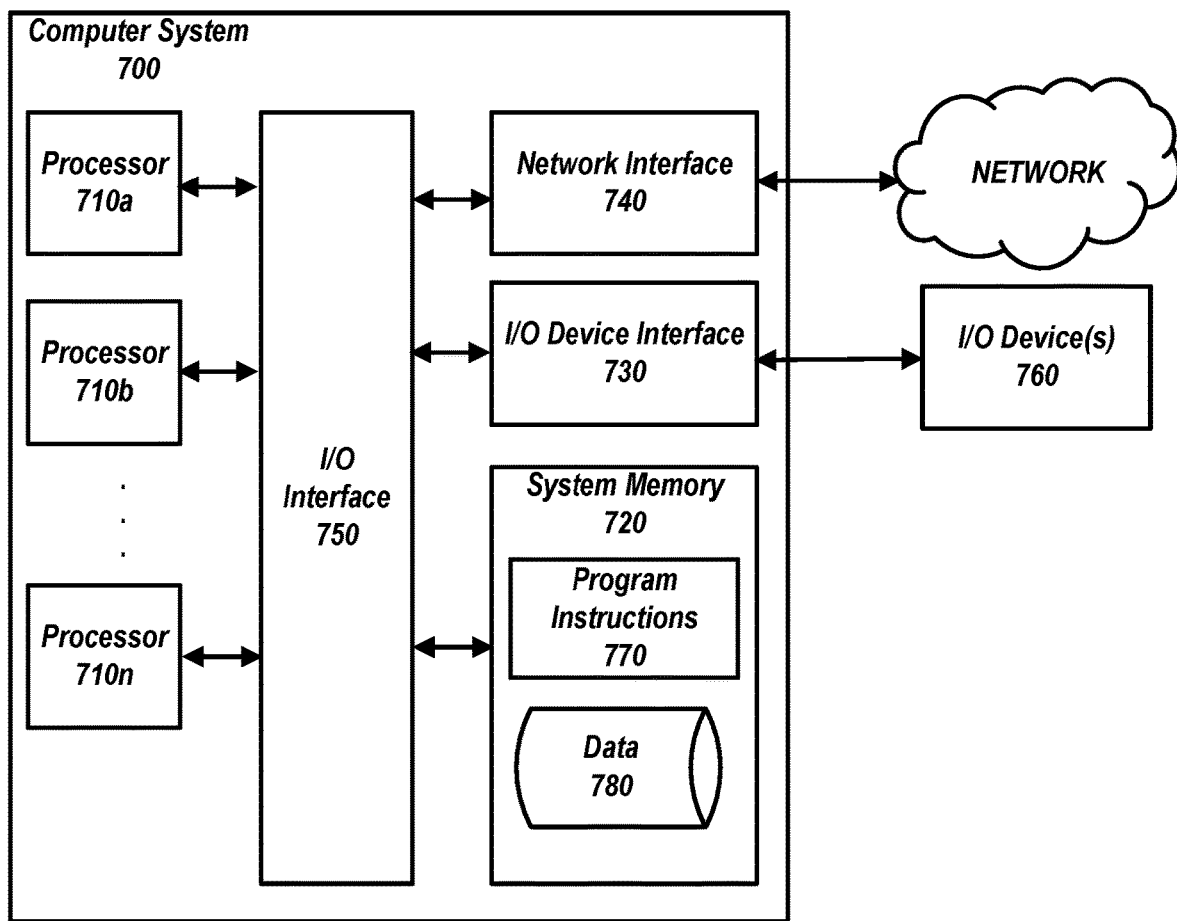
FIG. 7 illustrates a computing device, in accordance with one or more embodiments of this disclosure.

FIG. 7 shows an example computing system 700 that may be used in accordance with some embodiments of this disclosure. In some instances, computing system 700 is referred to as a computer system 700. A person skilled in the art would understand that those terms may be used interchangeably. The components of FIG. 7 may be used to perform some or all operations discussed in relation to FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an I/O interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 700 may include a plurality of computing devices (e.g., distributed computer systems) to implement various processing functions.

I/O device interface 730 may provide an interface for connection of one or more I/O devices 760 to computing system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computing system 700 through a wired or wireless connection. I/O devices 760 may be connected to computing system 700 from a remote location. I/O devices 760 located on remote computer systems, for example, may be connected to computing system 700 via a network and network interface 740.

Network interface 740 may include a network adapter that provides for connection of computing system 700 to a network. Network interface 740 may facilitate data exchange between computing system 700 and other devices connected to the network. Network interface 740 may support wired or wireless communication. The network may include an electronic communication network, such as the Internet, a LAN, a WAN, a cellular communications network, or the like.

System memory 720 may be configured to store program instructions 770 or data 780. Program instructions 770 may be executable by a processor (e.g., one or more of processors 710a-710n) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory, computer-readable storage medium. A non-transitory, computer-readable storage medium may include a machine readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 720 may include a non-transitory, computer-readable storage medium that may have program instructions stored thereon that are executable by a computer processor (e.g., one or more of processors 710a-710n) to cause the subject matter and the functional operations described herein. A memory (e.g., system memory 720) may include a single memory device or a plurality of memory devices (e.g., distributed memory devices).

I/O interface 750 may be configured to coordinate I/O traffic between processors 710a-710n, system memory 720, network interface 740, I/O devices 760, or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 700, or multiple computing systems 700 configured to host different portions or instances of embodiments. Multiple computing systems 700 may provide for parallel or sequential processing/execution of one or more portions of the techniques described herein.

Those skilled in the art will appreciate that computing system 700 is merely illustrative, and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a computing device, a mobile telephone, a personal digital assistant (PDA), a mobile audio or video player, a game console, a vehicle-mounted computer, a Global Positioning System (GPS), or the like. Computing system 700 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 8:
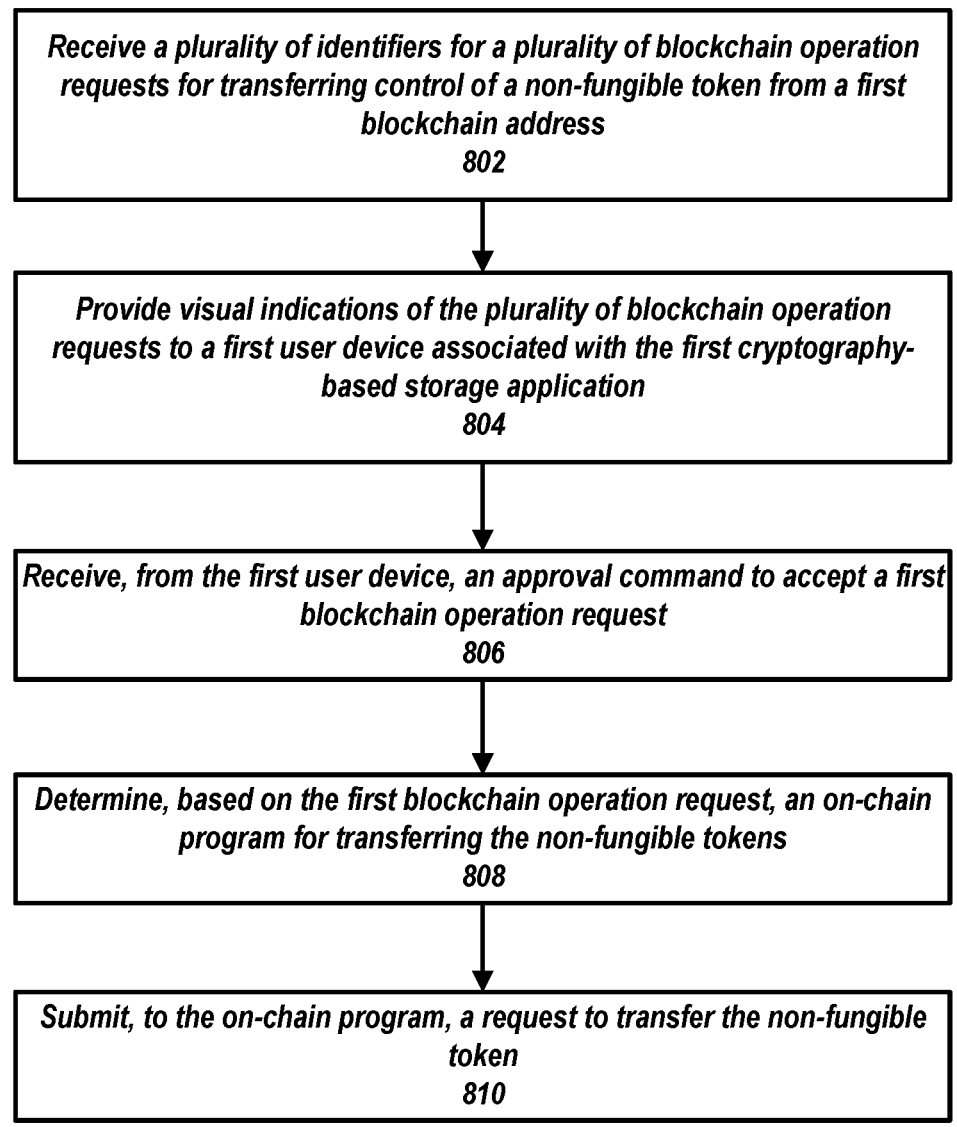
FIG. 8 is a flowchart of operations for performing cryptographic operations, in accordance with one or more embodiments of this disclosure.

FIG. 8 is a flowchart 800 of operations for performing cryptographic operations, in accordance with one or more embodiments of this disclosure. The operations of FIG. 8 may use components described in relation to FIG. 7. In some embodiments, bid acceptance system 102 may include one or more components of computing system 700.

At 802, bid acceptance system 102 receives a plurality of identifiers for a plurality of blockchain operation requests for transferring control of an NFT from a first blockchain address. For example, bid acceptance system 102 may receive the plurality of identifiers from data node 104 or from another suitable source. Bid acceptance system 102 may receive the plurality of identifiers over network 150 using network interface 740. At 804, bid acceptance system 102 provides visual indications of the plurality of blockchain operation requests to a first user device associated with the first cryptography-based storage application. Bid acceptance system 102 may use I/O device interface 730 or I/O device 760 to provide the visual indications.

At 806, bid acceptance system 102 receives, from the first user device, an approval command to approve a first blockchain operation request. For example, bid acceptance system 102 may receive the command using a blockchain node via a network 150. At 808, bid acceptance system 102 may determine, based on the first blockchain operation request, an on-chain program for transferring the NFTs. Bid acceptance system 102 may use one or more processors 710a, 710b, or 710n to perform the determination. At 810, bid acceptance system 102 may submit, to the on-chain program, a request to transfer the NFT. For example, bid acceptance system 102 may submit the request using a blockchain node via network 150.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques for performing cryptographic operations will be better understood with reference to the following enumerated embodiments:

1. A method for performing cryptographic operations, the method comprising: receiving, from a third-party platform, a plurality of identifiers for a plurality of blockchain operation requests for transferring control of a non-fungible token from a first blockchain address to a second blockchain address in exchange for one or more fungible tokens; providing visual indications of the plurality of blockchain operation requests to a first user device associated with a first cryptography-based storage application; receiving, from the first user device, an approval command to approve a first blockchain operation request of the plurality of blockchain operation requests; determining, based on the first blockchain operation request, an on-chain program for transferring the non-fungible token; and submitting, to the on-chain program, a request to transfer the non-fungible token to the second blockchain address associated with the approved first blockchain operation request.
2. The preceding embodiments, wherein the approval command comprises an approval blockchain operation signed with a private key associated with the first blockchain address.
3. Any of the preceding embodiments, further comprising: retrieving a source identifier for a source of the first blockchain operation request; and transmitting, to the first user device, a new blockchain operation request to approve the on-chain program associated with the first blockchain operation request.
4. Any of the preceding embodiments, further comprising: retrieving a source identifier for a source of the first blockchain operation request; determining whether the first blockchain address is initialized with the source of the first blockchain operation request; and in response to determining that the first blockchain address is not initialized with the source of the first blockchain operation request, transmitting, to the first user device associated with the first blockchain address, a message to initialize the first blockchain address with the source of the first blockchain operation request.
5. Any of the preceding embodiments, further comprising: retrieving a source identifier for a source of the first blockchain operation request; determining whether the first blockchain address is initialized with the source of the first blockchain operation request; and in response to determining that the first blockchain address is not initialized with the source of the first blockchain operation request, transmitting, to the first user device associated with the first blockchain address, one or more blockchain operation requests to initialize the first blockchain address with the source and to approve the on-chain program to be able to transfer the non-fungible token from the first blockchain address.
6. Any of the preceding embodiments, further comprising: retrieving a source identifier for a source of the first blockchain operation request; determining whether the first blockchain address is initialized with the source of the first blockchain operation request; extracting a program identifier for the on-chain program; determining whether the on-chain program has been approved to transfer the non-fungible token from the first blockchain address; and in response to determining that the first blockchain address is initialized with the source of the first blockchain operation request and that the on-chain program has not been approved to transfer the non-fungible token from the first blockchain address, transmitting, to the first user device associated with the first blockchain address, a blockchain operation request to approve the on-chain program to be able to transfer the non-fungible token from the first blockchain address.
7. Any of the preceding embodiments, further comprising: determining a type of a source of one or more blockchain operation requests of the plurality of blockchain operation requests; based on determining that the type of the source is a computing platform, initiating a corresponding application programming interface to request, from the computing platform, the one or more blockchain operation requests; and based on determining that the type of the source is the on-chain program, transmitting a new blockchain operation request via a blockchain node to the on-chain program, requesting the one or more blockchain operation requests.
8. Any of the preceding embodiments, further comprising: determining whether the second blockchain address comprises at least the one or more fungible tokens; and in response to determining that the second blockchain address does not comprise at least the one or more fungible tokens, outputting another visual indication that the control of the non-fungible token will not transfer from the first blockchain address to the second blockchain address.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

What is claimed is:

1. A system for performing cryptographic operations, the system comprising:
one or more processors; and
a non-transitory computer-readable storage medium storing instructions, which when executed by the one or more processors cause the one or more processors to perform operations comprising:
determining that a first source of one or more first blockchain operation requests, of a plurality of blockchain operation requests for transferring control of a non-fungible token from a first blockchain address to another blockchain address, is a computing platform;
based on determining that the first source of the one or more first blockchain operation requests is the computing platform, requesting the one or more first blockchain operation requests by initiating an application programming interface (API) corresponding to the computing platform;
determining that a second source of one or more second blockchain operation requests, of the plurality of blockchain operation requests, is an on-chain program;

based on determining that the second source of the one or more second blockchain operation requests is the on-chain program, requesting the one or more second blockchain operation requests by transmitting a request to the on-chain program;

receiving, at least partially from the computing platform and the on-chain program, a plurality of identifiers for the plurality of blockchain operation requests, wherein a first blockchain operation request, of the one or more first blockchain operation requests or the one or more second blockchain operation requests, indicates a proposed first transfer of control of the non-fungible token to a second blockchain address and a second transfer of control of one or more fungible tokens to the first blockchain address;

determining that the first blockchain operation request comprises an indicator of the non-fungible token and one or more indicators of the one or more fungible tokens;

providing visual indications of the plurality of blockchain operation requests to a first computing device associated with a first cryptography-based storage application;

receiving, from the first computing device, an approval command to approve the first blockchain operation request of the plurality of blockchain operation requests;

determining that the approval command comprises an approval blockchain operation signed with a private key associated with the first blockchain address;

determining a particular on-chain program for transferring the non-fungible token, wherein the particular on-chain program is the on-chain program or a different on-chain program; and submitting, to the particular on-chain program, a request to transfer the non-fungible token to the second blockchain address according to the first blockchain operation request.

2. The system of claim 1, wherein the instructions further cause the one or more processors to perform operations comprising:

retrieving a source identifier for a source of the first blockchain operation request, wherein the source of the first blockchain operation request is the computing platform or the on-chain program;

determining that the first blockchain address is not initialized with the source of the first blockchain operation request; and in response to determining that the first blockchain address is not initialized with the source of the first blockchain operation request, transmitting, to the first computing device, a message to initialize the first blockchain address with the source of the first blockchain operation request.

3. The system of claim 1, wherein the instructions further cause the one or more processors to perform operations comprising:

determining that the first blockchain address is not initialized; and in response to determining that the first blockchain address is not initialized, transmitting, to the first computing device, one or more blockchain operation requests to initialize the first blockchain address and to approve the particular on-chain program to be able to transfer the non-fungible token from the first blockchain address.

4. The system of claim 1, wherein the instructions further cause the one or more processors to perform operations comprising:

retrieving a source identifier for a source of the first blockchain operation request;

determining that the first blockchain address is initialized with the source of the first blockchain operation request;

extracting a program identifier for the on-chain program;

determining that the particular on-chain program has been approved to transfer the non-fungible token from the first blockchain address; and in response to determining that the first blockchain address is initialized with the source of the first blockchain operation request and that the on-chain program has not been approved to transfer the non-fungible token from the first blockchain address, transmitting, to the first computing device associated with the first blockchain address, a blockchain operation request to approve the on-chain program to be able to transfer the non-fungible token from the first blockchain address.

5. A method comprising:

determining whether a source of one or more blockchain operation requests, of a plurality of blockchain operation requests for transferring control of a non-fungible token from a first blockchain address to another blockchain address, is a computing platform or an on-chain program;

when the source of the one or more blockchain operation requests is the computing platform, requesting the one or more blockchain operation requests by initiating an application programming interface (API) corresponding to the computing platform;

when the source of the one or more blockchain operation requests is the on-chain program, requesting the one or more blockchain operation requests by transmitting a request to the on-chain program;

receiving, at least partially from one or more of the computing platform or the on-chain program, a plurality of identifiers for the plurality of blockchain operation requests;

providing visual indications of the plurality of blockchain operation requests to a first user device associated with a first cryptography-based storage application;

receiving, from the first user device, an approval command to approve a first blockchain operation request of the one or more blockchain operation requests;

determining, based on the first blockchain operation request, a particular on-chain program for transferring the non-fungible token, wherein the particular on-chain program is the on-chain program or a different on-chain program; and submitting, to the particular on-chain program, a request to transfer the non-fungible token to a second blockchain address associated with the first blockchain operation request.

6. The method of claim 5, wherein the approval command comprises an approval blockchain operation signed with a private key associated with the first blockchain address.

7. The method of claim 5, further comprising:

retrieving a source identifier for the first blockchain operation request; and transmitting, to the first user device, a new blockchain operation request to approve the particular on-chain program associated with the first blockchain operation request.

8. The method of claim 5, further comprising:
retrieving a source identifier for the first blockchain operation request;
determining, based on the source identifier, that the first blockchain address is not initialized with the source; and
in response to determining that the first blockchain address is not initialized with the source, transmitting, to the first user device associated with the first blockchain address, a message to initialize the first blockchain address with the source of the first blockchain operation request.

9. The method of claim 5, further comprising:
retrieving a source identifier for the first blockchain operation request;
determining, based on the source identifier, that the first blockchain address is not initialized with the source; and
in response to determining that the first blockchain address is not initialized with the source, transmitting, to the first user device associated with the first blockchain address, one or more blockchain operation requests to initialize the first blockchain address with the source and to approve the on-chain program to be able to transfer the non-fungible token from the first blockchain address.

10. The method of claim 5, further comprising:
retrieving a source identifier for the first blockchain operation request;
determining, based on the source identifier, that the first blockchain address is initialized with the source;
extracting a program identifier for the on-chain program;
determining that the particular on-chain program has been approved to transfer the non-fungible token from the first blockchain address; and
in response to determining that the first blockchain address is initialized with the source of the first blockchain operation request and that the on-chain program has not been approved to transfer the non-fungible token from the first blockchain address, transmitting, to the first user device associated with the first blockchain address, a blockchain operation request to approve the particular on-chain program to be able to transfer the non-fungible token from the first blockchain address.

11. The method of claim 5, wherein requesting the one or more blockchain operation requests by transmitting the request to the on-chain program comprises:
based on determining that the source is the on-chain program, transmitting a new blockchain operation request via a blockchain node to the on-chain program.

12. The method of claim 5, further comprising:
determining that the second blockchain address does not comprise at least one or more fungible tokens; and
in response to determining that the second blockchain address does not comprise at least the one or more fungible tokens, outputting another visual indication that the control of the non-fungible token will not transfer from the first blockchain address to the second blockchain address.

13. A non-transitory, computer-readable medium, comprising instructions that, when executed by one or more processors, cause operations comprising:
determining a source of one or more blockchain operation requests, of a plurality of blockchain operation requests for transferring control of a non-fungible token from a first blockchain address to another blockchain address, is a computing platform or an on-chain program;
when the source of the one or more blockchain operation requests is the computing platform, requesting the one or more blockchain operation requests by initiating an application programming interface (API) corresponding to the computing platform;
when the source of the one or more blockchain operation requests is the on-chain program, requesting the one or more blockchain operation requests by transmitting a request to the on-chain program;
receiving, at least partially from one or more of the computing platform or the on-chain program, a plurality of identifiers for the plurality of blockchain operation requests;
providing visual indications of the plurality of blockchain operation requests to a first user device associated with a first cryptography-based storage application;
receiving, from the first user device, an approval command to approve a first blockchain operation request of the one or more blockchain operation requests;
determining, based on the first blockchain operation request, a particular on-chain program for transferring the non-fungible token, wherein the particular on-chain program is the on-chain program or a different on-chain program; and
submitting, to the particular on-chain program, a request to transfer the non-fungible token to a second blockchain address associated with the first blockchain operation request.

14. The non-transitory, computer-readable medium of claim 13, wherein the approval command comprises an approval blockchain operation signed with a private key associated with the first blockchain address.

15. The non-transitory, computer-readable medium of claim 13, wherein the instructions cause the one or more processors to perform operations comprising:
transmitting, to the first user device, a new request to approve the particular on-chain program.

16. The non-transitory, computer-readable medium of claim 13, wherein the instructions cause the one or more processors to perform operations comprising:
and
transmitting, to the first user device associated with the first blockchain address, a message to initialize the first blockchain address with the source.

17. The non-transitory, computer-readable medium of claim 13, wherein the instructions cause the one or more processors to perform operations comprising:
transmitting, to the first user device associated with the first blockchain address, one or more requests to initialize the first blockchain address with the source and to approve the on-chain program to be able to transfer the non-fungible token from the first blockchain address.

18. The non-transitory, computer-readable medium of claim 13, wherein the instructions cause the one or more processors to perform operations comprising:
transmitting, to the first user device associated with the first blockchain address, a request to approve the particular on-chain program to be able to transfer the non-fungible token from the first blockchain address.

19. The non-transitory, computer-readable medium of claim 13, wherein the instructions further cause the one or more processors to perform operations comprising:
determining that the second blockchain address does not comprise at least one or more fungible tokens; and
in response to determining that the second blockchain address does not comprise at least the one or more fungible tokens, outputting another visual indication that the control of the non-fungible token will not transfer from the first blockchain address to the second blockchain address.

20. The method of claim 5, further comprising:
determining that the first blockchain operation request comprises an indicator of the non-fungible token and one or more indicators of one or more fungible tokens.

* * * * *